Nov. 16, 1943.  T. F. PHILIPPI  2,334,285
BALANCED ROTARY BODY
Filed May 4, 1942
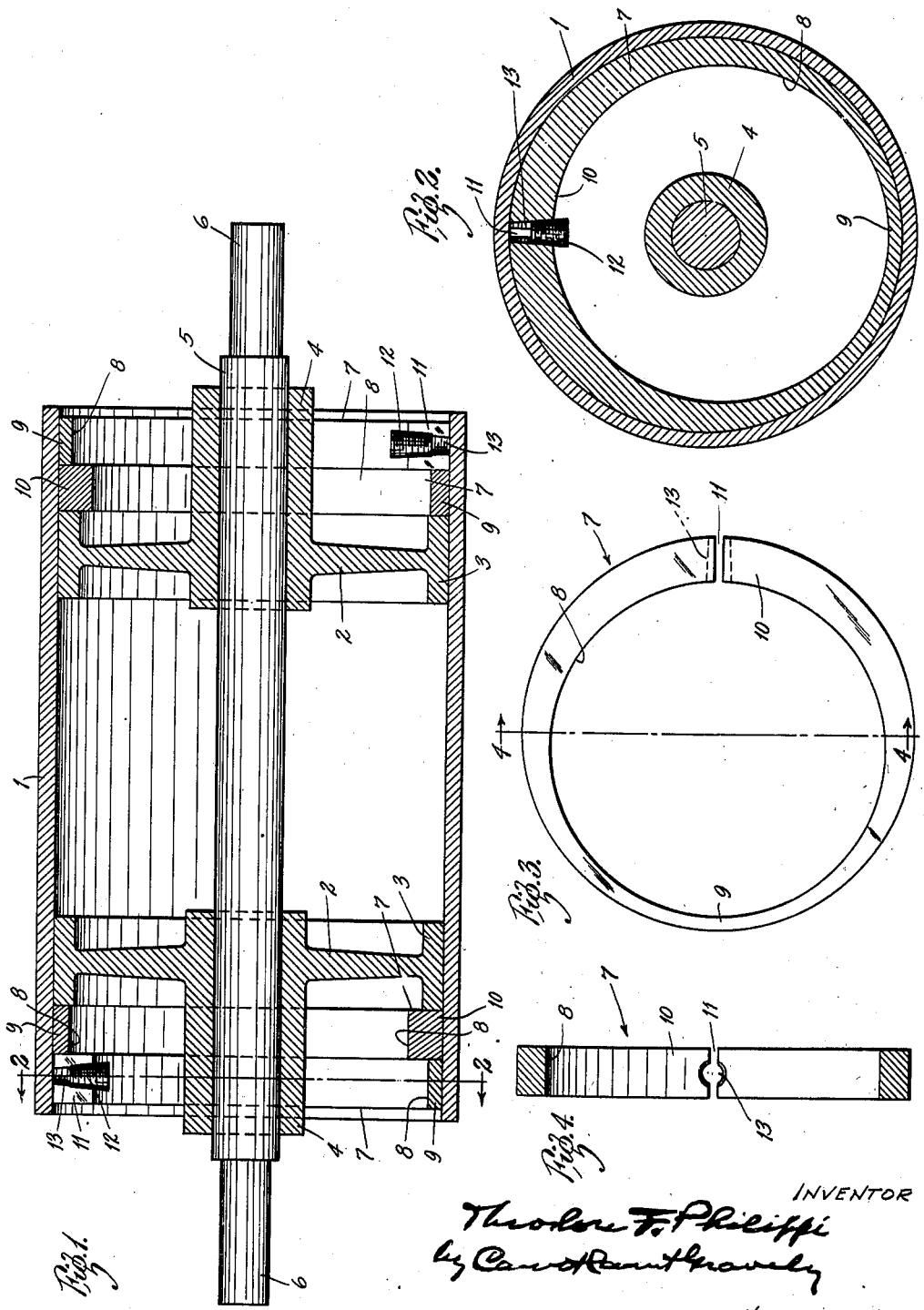
INVENTOR
Theodore F. Philippi
HIS ATTORNEYS Patented Nov. 16, 1943

2,334,285

UNITED STATES PATENT OFFICE 2,334,285

BALANCED ROTARY BODY

Theodore F. Philippi, St. Louis, Mo.

Application May 4, 1942, Serial No. 441,721

3 Claims. (Cl. 74—573)

This invention relates to the balancing of rotating bodies, particularly bodies that are long in proportion to their diameter. The principal object of the invention is to provide independently adjustable means at both ends of the rotary body for quickly and easily placing the same in running or dynamic balance. Other objects are to provide for quickly and easily locking each balancing means in the desired position of adjustment and to provide for mounting such means in the ends of a rotary hollow cylindrical body without alteration thereof. The invention consists in mounting a plurality of annular weights or balancing rings in each end of the rotary body for rotation relative thereto and to each other about the rotary axis of said body and in disposing the openings in said rings eccentric to such rotary axis. The invention also consists in providing each ring with means for locking it to the rotary body in the desired position of rotary adjustment. The invention also consists in the construction, combinations and arrangements of parts hereinafter described.

In the accompanying drawing, which forms part of this specification and wherein like symbols refer to like parts wherever they occur, Fig. 1 is a central longitudinal section through a hollow cylindrical rotary body provided with a balancing means embodying my invention, Fig. 2 is a transverse section through said body, the section being taken through one of the balancing rings on the line 2—2 in Fig. 1, Fig. 3 is an end view of one of the balancing rings; and Fig. 4 is a cross-section through said ring on the line 4—4 in Fig. 3.

In the accompanying drawing, my invention is shown embodied in a rotary body comprising a comparatively long hollow cylinder or drum 1 provided near each end with a supporting member or spider 2. Each of the hollow drum supporting members 2 has a rim portion 3, which fits in and is rigid with the hollow drum 1 inwardly of the end thereof, and an elongated hub portion 4, which is rigidly mounted on a supporting shaft 5 having journals 6 at the ends thereof. Mounted in the drum 1 between each end thereof and the rim 3 of the supporting member 2 for that end of the drum are two radially split annular balancing weights or rings 7 that are preferably disposed in endwise abutting relation, with the innermost ring abutting endwise against the outer end of the rim 3 of the adjacent drum supporting member 2. The rings 7 have the openings 8 therein disposed eccentric to the rotary axis of the drum 1. The openings 8 are preferably of the same diameter and eccentricity and provide each ring with diametrically opposed light and heavy portions 9 and 10, respectively, the split 11 in each ring being preferably located in the thick or heavy side thereof.

The split rings 7 are rotatable in the drum 1 relative thereto and to each other; and each ring is adapted to be expanded into engagement with the inner peripheral surface of said drum so as to lock the ring therein in the desired position of rotary adjustment. The expanding means for each ring comprises a tapered screw 12 that is threaded through an outwardly tapering radial screw hole 13 provided therefor in the thick or heavy portion 10 of the ring, with the split 10 therein disposed along a diameter of said screw hole, whereby tightening of said screw in said hole spreads the split ends of the ring apart and expands the ring into engagement with the drum 1.

The drum 1 is placed in running or dynamic balance by mounting the journal ends 6 of the drum supporting shaft 5 in suitable supporting bearings (not shown). Two rings are then mounted in each end of the drum with the heavy side of one ring adjacent to the light side of the other ring. The rings are then rotated relative thereto and to each other to statically balance the drum. The rings are then locked to the drum by means of the screws 11 and the drum is then rotated at the speed at which it is to operate. Vibration of the drum at this speed indicates dynamic unbalance; and this unbalanced condition is corrected by releasing the clamping screws and rotating the rings relative to the drum and to each other until the rings are in a position of rotary adjustment that will correct the dynamic unbalance and cause the drum to rotate without vibration. In practice, first one end and then the other end of the drum is balanced; and it may be necessary to rebalance the end first balanced if it is unbalanced by the balancing of the second end. The amount and direction of rotation or angular adjustment of the rings may be readily determined by trial.

What I claim is:

1. A relatively long hollow cylindrical body, a pair of radially split balancing rings mounted in each end of said body for rotation relative thereto and to one another about the rotary axis thereof and with their openings disposed eccentric to said axis, and a separate wedge member engaging the split portion of each ring for expanding the same into engagement with the inner peripheral surface of said body.

2. A relatively long hollow cylindrical rotary body, a pair of balancing rings mounted within said body for rotation relative thereto and to one another about the rotary axis of said body and having their openings disposed eccentric to said rotary axis, each of said rings being split radially and having a tapered screw-threaded hole extending radially through said split portion, and a tapered screw threaded into the tapered hole of each ring for expanding said ring into engagement with the inner peripheral surface of said body.

3. A relatively long hollow cylindrical rotary body, a supporting shaft therefor, spiders adjacent to the ends of said body and having rim portions mounted in and rigid with said body inwardly of the ends thereof and hub portions rigidly mounted on said shaft, a pair of radially split balancing rings rotatably mounted in said body between the rim portion of each spider and the adjacent end of said body for rotation relative to said body and to one another about the rotary axis of said shaft, each of said rings having an outwardly tapering screw-threaded hole extending radially through the split portion thereof, and a tapered screw threaded into said hole for expanding said ring into engagement with the inner peripheral surface of said body.

THEODORE F. PHILIPPI.